United States Patent [19]
Gillingham et al.

[11] Patent Number: 5,920,439
[45] Date of Patent: *Jul. 6, 1999

[54] METHOD FOR DETERMINING LONGITUDINAL POSITION ON A MAGNETIC TAPE HAVING AN EMBEDDED POSITION COUNT FIELD

[75] Inventors: Ronald Dean Gillingham, Longmont; Steven Gregory Trabert; John Paul Mantey, both of Boulder; Keith Gary Boyer, Thornton, all of Colo.

[73] Assignee: Storage Technology Corporation, Louisville, Colo.

[ * ] Notice: This patent is subject to a terminal disclaimer.

[21] Appl. No.: 08/804,446

[22] Filed: Feb. 21, 1997

[51] Int. Cl.$^6$ ........................................................ G11B 5/09
[52] U.S. Cl. .............................................. 360/48; 360/72.2
[58] Field of Search ............................... 360/48, 72.2, 53, 360/57, 77.12, 78.01, 78.02, 78.06, 69, 50; 364/174; 395/311

[56] References Cited

U.S. PATENT DOCUMENTS

| | | | |
|---|---|---|---|
| 3,916,440 | 10/1975 | Irwin | 360/50 |
| 4,442,502 | 4/1984 | Friend et al. | 395/311 |
| 4,462,053 | 7/1984 | Lum et al. | 360/78.06 |
| 4,472,750 | 9/1984 | Klumpp et al. | 360/78.01 |
| 4,498,129 | 2/1985 | Velazquez | 364/174 |
| 4,586,094 | 4/1986 | Chambors et al. | 360/77.12 |
| 4,646,175 | 2/1987 | Sokolik et al. | 360/78.02 |
| 4,996,609 | 2/1991 | Joannou | 360/57 |
| 5,229,895 | 7/1993 | Schwarz et al. | 360/77.12 |
| 5,384,669 | 1/1995 | Dunn et al. | 360/48 |
| 5,386,324 | 1/1995 | Fry et al. | 360/53 |
| 5,394,277 | 2/1995 | Pahr et al. | 360/69 X |
| 5,394,280 | 2/1995 | Chliwyj et al. | 360/77.12 |
| 5,396,376 | 3/1995 | Chambors et al. | 360/48 |
| 5,408,366 | 4/1995 | Bentley et al. | 360/53 |

OTHER PUBLICATIONS

Timing based track following servo for Magnetic Tape; Barrett, Albrecht, Faton; IEEE; Jul., 1996.
Design of a Disk File Head Positioning Servo; R K. Oswald; IBM J. Res. Develop. ; Nov., 1974.

*Primary Examiner*—Aristotelis M. Psitos
*Assistant Examiner*—Patrick Wamsley
*Attorney, Agent, or Firm*—Brooks & Kushman P.C.

[57] ABSTRACT

A method for determining the longitudinal position of a length of magnetic tape with respect to the tape head. A data field on each frame of the servo stripe includes a digital one or a zero. An adjacent series of data fields are arranged in a predetermined sequence defining synchronization and position count fields. Identifying the position count field allows the tape controller to accurately determine where, along the length of the tape, the tape head is currently positioned.

20 Claims, 3 Drawing Sheets

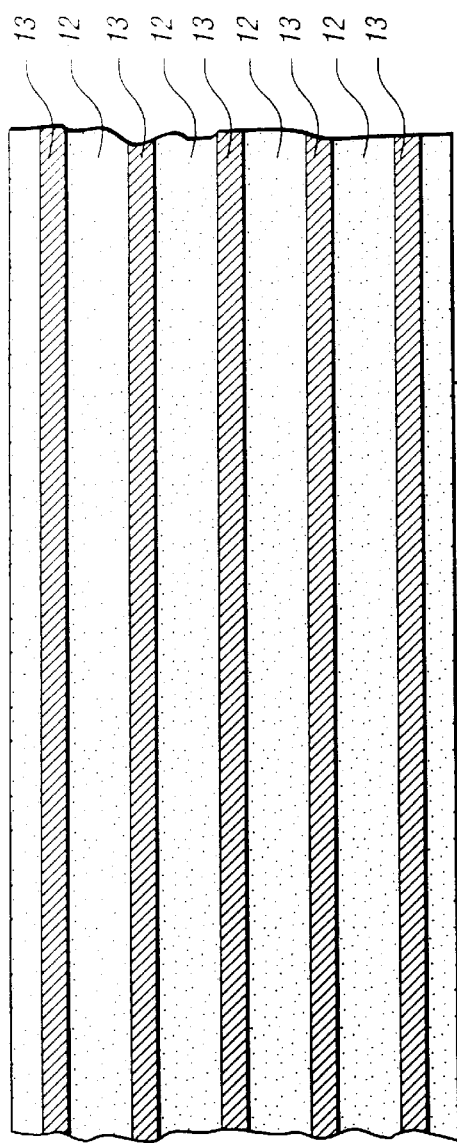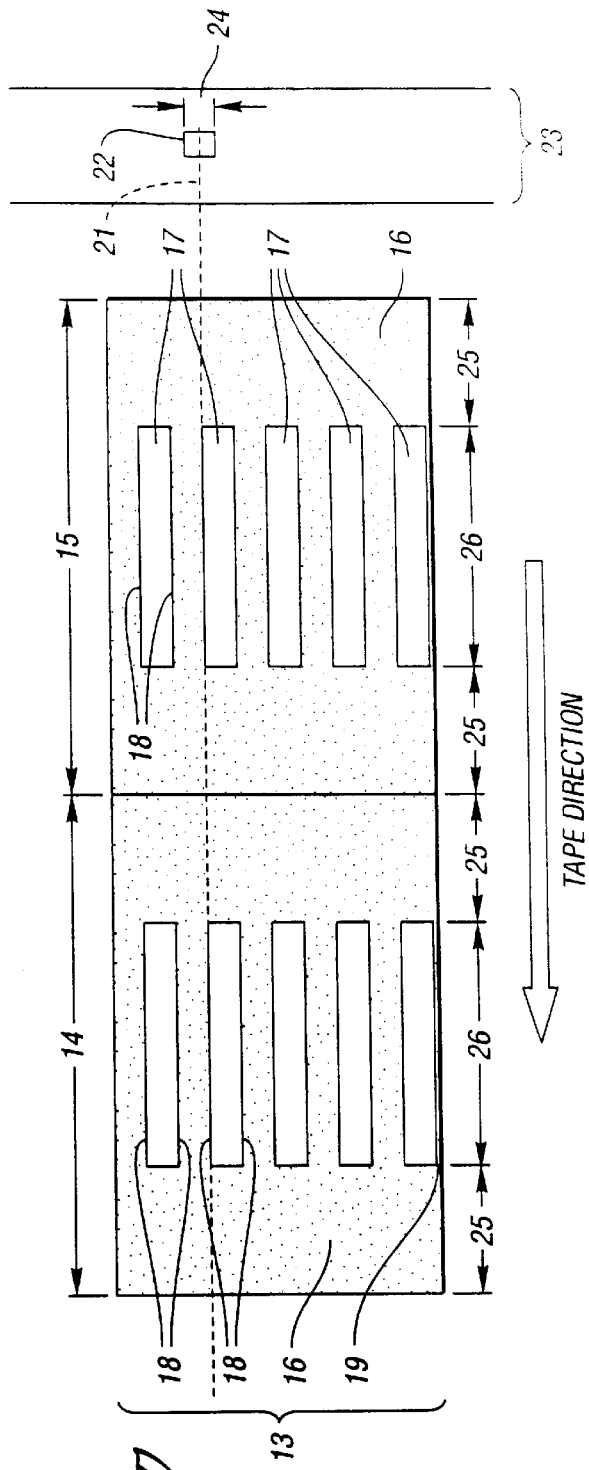
Fig. 1 (PRIOR ART)
Fig. 2 (PRIOR ART)

METHOD FOR DETERMINING LONGITUDINAL POSITION ON A MAGNETIC TAPE HAVING AN EMBEDDED POSITION COUNT FIELD

BACKGROUND OF THE INVENTION

1. Field of the Invention

The invention relates to the field of dynamic magnetic information storage or retrieval. More particularly, the invention relates to the field of automatic control of a recorder mechanism. In still greater particularity, the invention relates to longitudinal position determination using a servo pattern. By way of further characterization, but not by way of limitation thereto, the invention is a method for determining longitudinal position on magnetic tape by reading a servo pattern.

2. Description of the Related Art

Magnetic tape recording has been utilized for many years to record voice and data information. For information storage and retrieval, magnetic tape has proven especially reliable, cost efficient and easy to use. In an effort to make magnetic tape even more useful and cost effective, there have been attempts to store more information per given width and length of tape. This has generally been accomplished by including more data tracks on a given width of tape which, in turn, means more data is stored on a given length of tape. In many systems, multiple volumes of data are written onto a single reel or tape cartridge. This increase in data storage density requires more accurate tape—tape head longitudinal position determination. That is, as more data is written onto a single track, precise longitudinal positioning of the tape with respect to the tape head becomes more critical. By longitudinal is meant the direction along the length of the magnetic tape.

In order to increase data track accuracy, servo stripes have been employed to provide a reference point to maintain correct lateral positioning of the tape with respect to the tape read/write head. By lateral is meant the direction across the width of the tape. One or more servo stripes may be used depending upon the number of data tracks which are placed upon the tape. The sensed signal from the servo stripe is fed to a control system which moves the head and keeps the servo signal at nominal magnitude. The nominal signal occurs when the servo read gap is located in a certain position relative to the servo stripe. Referring to FIG. 1, a one-half inch wide magnetic tape 11 may contain up to 288 or more data tracks on multiple data bands 12. With such a large number of data tracks it may be desirable to include up to five or more servo stripes 13 to improve data read and write function performance. Servo stripes 13 may utilize various patterns or frequency regions to allow precise tape to tape head positioning.

Referring to FIG. 2, a portion of a conventional servo stripe 13 is shown having two frames 14 and 15. A first frequency signal 16 is written across the width of servo stripe 13. An erase frequency is written over first frequency signal 16 in a predetermined pattern such as five rectangles 17 in each of frames 14 and 15. The five rectangles 17 in each frame result in nine horizontal interfaces 18 between frequency signal 16 and erase patterns 17. The tenth edge 19 along the bottom is not utilized for these purposes. While five rectangles are shown in FIG. 2, it should be understood that more or fewer erase patterns may be used depending upon engineering design considerations. A dashed line 21 passes along one of edges 18 and through a read gap 22 in a tape read head 23. If servo pattern 13 is passed right to left over gap 22, then gap 22 will alternate between reading frequency 16 across the full width 24 of gap 22 in areas 25 and frequency 16 across one half of read gap 22 and an erase frequency from patterns 17 across the other half of width 24 in areas 26. The servo control system in the tape drive uses the ratio of full signal amplitude in field 25 to half signal amplitude in field 26 to stay on track. While allowing for tape head positioning with respect to the tape width, these prior art servo patterns do not address the longitudinal positioning of the tape. That is, it is critical for the servo to know where along the length of the tape the data volume is stored. This information is becoming more significant in modern systems where multiple volumes of data are written onto a single reel or tape cartridge. Many prior art systems use tachometers to measure reel motor revolutions and, by knowing reel dimensions and tape thickness, the longitudinal position of the tape with respect to the tape head can be estimated within some number of meters. However, with data compression and other techniques, the data streams are compressed onto increasingly shorter lengths of tape and position estimates to within meters are not sufficient. It would be desirable to be able to more accurately determine a location along the length of the tape where the desired data volume is stored.

SUMMARY OF THE INVENTION

The invention is a novel method for determining the longitudinal position of the tape with respect to the tape head. A data field is included in each frame of the tape servo pattern. Each data field includes a digital signal (high or low). Successive data fields are arranged in predetermined sequences to define position count fields and a synchronization field. The data field in each frame of the servo stripe is sensed by the tape read head as the frames pass over the tape head. The sensed sequence of data fields are recognized as a position count field. The tape controller can thus obtain longitudinal position information from the frames to accurately determine the location of a sequence of frames on the tape with respect to a reference point such as the tape head.

BRIEF DESCRIPTION OF THE DRAWINGS

FIG. 1 is an illustration of multiple servo stripes and data bands on magnetic tape;

FIG. 2 is an illustration of a servo stripe including multiple erase bands;

DESCRIPTION OF THE PREFERRED EMBODIMENT

Figure 3:
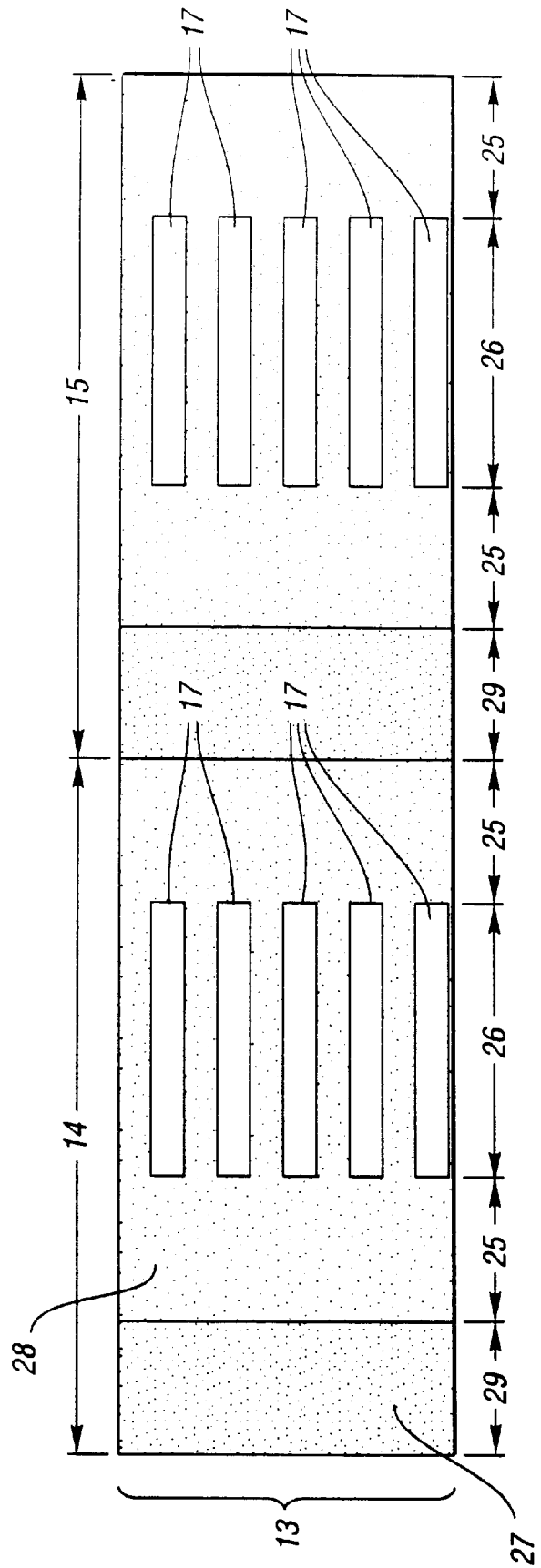
FIG. 3 is an illustration of a servo stripe including a synchronization frequency area.

Referring to the drawings wherein like reference numerals denote like structure throughout each of the various drawings, FIG. 1 illustrates multiple servo stripes 13 written onto a given tape portion 11 to allow precise positioning of data stripes 12 with respect to a tape head (not shown). FIG. 3 illustrates a servo pattern written as servo stripe 13 onto tape 11. FIG. 3 illustrates the invention described and claimed in a United States Patent Application entitled TAPE SERVO PATTERN WITH ENHANCED SYNCHRONIZA- TION PROPERTIES filed on the same date as the present application and assigned to a common assignee, which application is hereby incorporated by reference. Referring to FIG. 3, a first synchronization frequency signal is written on a first area 27 across the width of servo stripe 13. A second frequency signal different from the first frequency signal is written on a second area 28 across the width of servo stripe 13. First area 27 and second area 28 together comprise one frame 14. First synchronization frequency area 27 and second different frequency area 28 are then alternately written onto servo stripe 13 in successive frames 15, etc. along a length of tape 11. A third erase frequency signal is written in a predetermined precise pattern in each frame over second area 28. In the preferred embodiment, the third frequency is written as an erase signal in the form of parallelograms 17 which may take the form of a square or rectangle. While five parallelograms are shown in FIG. 3, it should be understood that more or fewer may be used depending upon the application as will be apparent to one skilled in the art. During operation of the tape drive, the lateral position of the tape head relative to the tape is controlled by servo readers which monitor the output signal when the reader is positioned at the edge of erase bands 17.

Referring to FIG. 3, fields 25 and 26 in frames 14 and 15 may be identical to those in FIG. 2. However, the signal frequency in area 27 is approximately double that of second frequency area 28. Thus, the frequency in field 29 of the signal sensed by the read gap 22 is approximately double the sensed frequency in adjacent field 25 such that the beginning of a frame 14, 15 is determined when this increased frequency is sensed.

Figure 4:
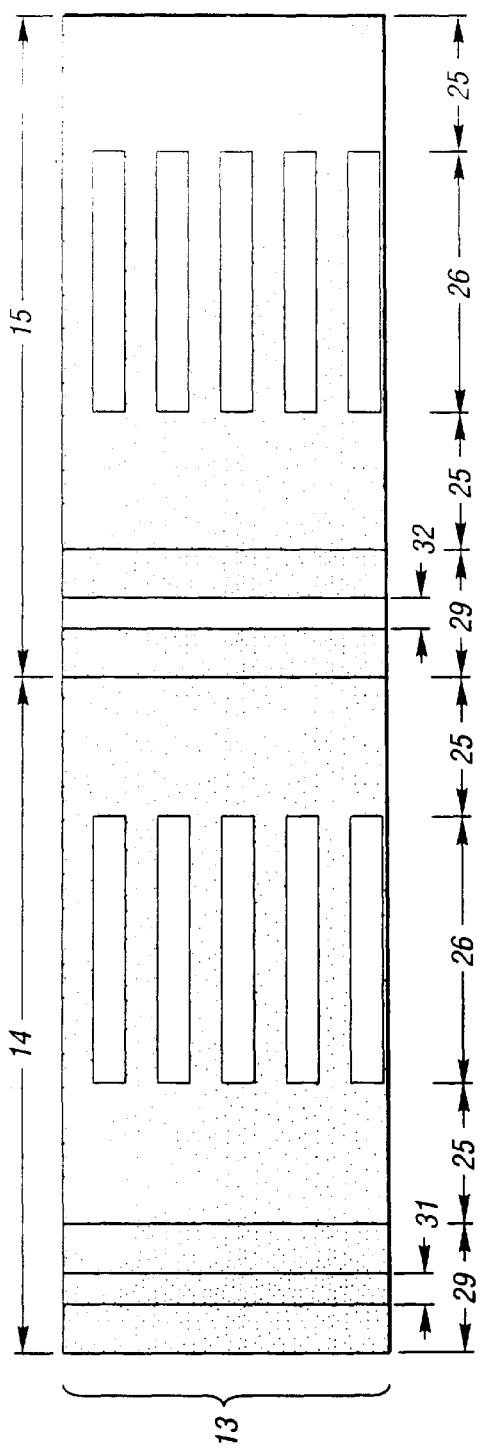
FIG. 4 is an illustration of a servo stripe including a data field in the synchronization area.
Figure 5:
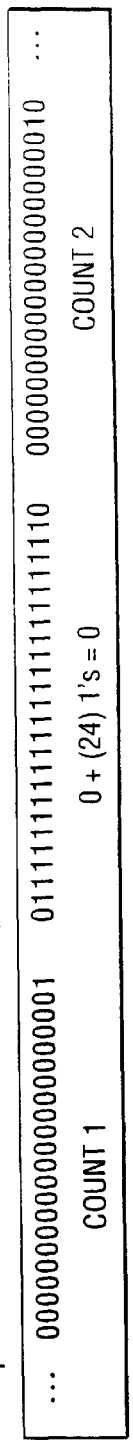
FIG. 5 is an illustration of a servo stripe with multiple grouped frames.
Figure 6:
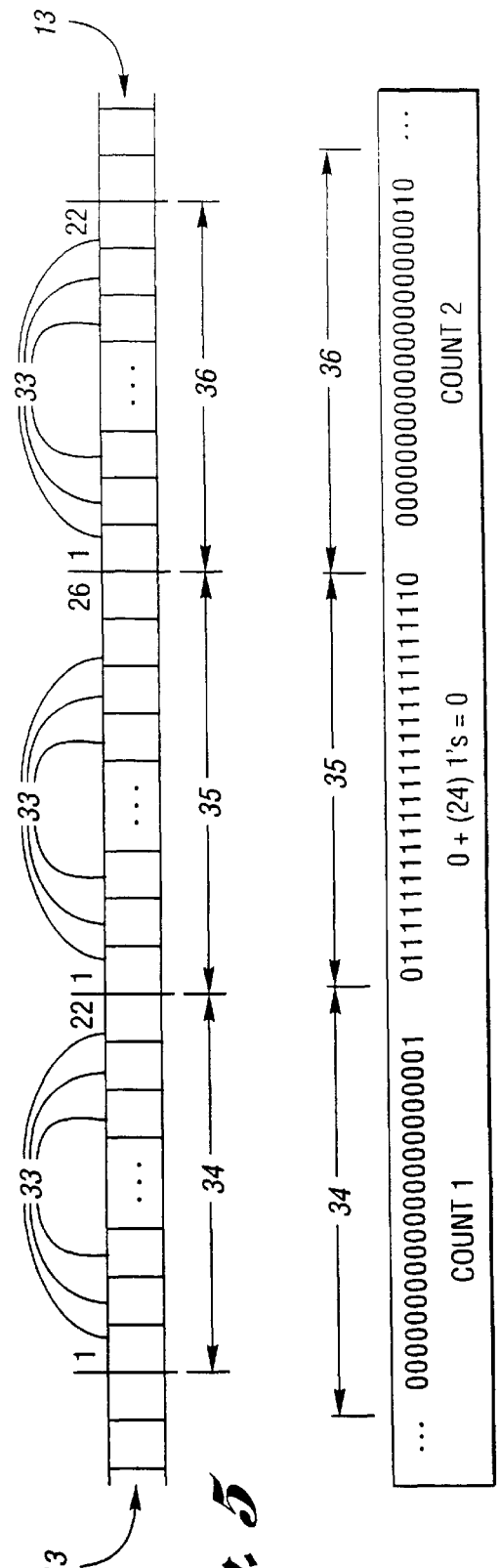
FIG. 6 is an illustration of a grouping of data bits from the grouped frames of FIG. 5.

The present invention is illustrated in FIG. 4. Data fields 31 and 32 have been added to fields 29. Field 31 represents a high (1) signal and field 32 represents a low (0) signal. By arranging these data fields in a predetermined sequence, a series of data bits 33 can be identified. Referring to FIG. 5, servo stripe 13 is shown as a plurality of bits 33. Bits 33 are grouped into a sequence of 22 bits in a position count fields 34, 36 and 26 bits in a synchronization field 35. Each bit 33 represents either a "1" or a "0" from a field 31 or 32 in a frame 14 or 15. The effect is that each position count field 34, 36 and each synchronization field 35 will represent a series of "0"s and "1"s as shown in FIG. 6. By arranging these "0"s and "1"s in a unique pattern, each position count field can be determined by the tape controller. Thus the longitudinal position of the tape head with respect to a series of frames on the tape can be determined.

Referring to FIG. 6, the data counts ("0"s and "1"s) for position count fields 34, 36 and for synchronization field 35 are illustrated. Synchronization field 35 is used to separate the position count fields 34, 36 and to make identification of the position count fields possible. A synchronization field 35 is alternated with each position count field 34, 36 etc. along the entire length of the tape.

Position count fields 34, 36 consist of 22 bits with a unique combination of "0"s and "1"s for each position count field. Each position count field 34, 36 may be decoded by the tape controller to identify the longitudinal position of the tape with respect to the tape head at that particular position count field. In the preferred embodiment the longitudinal position is encoded using binary encoding into the position count field. Position count field 34 consists of 21 "0"s followed by a "1". This encodes the longitudinal position 1. Position count field 36 consists of 20 "0"s followed by a "1" followed by a "0". This encodes longitudinal position 2. Similarly, subsequent position count fields along the tape contain the encoded longitudinal position of each position count field. The longitudinal position of each position count field increments by one for each position count field along the length of the tape.

At the precise moment that the tape controller seeks to obtain longitudinal position information, the servo read head could be positioned adjacent to any position along the tape length. The servo read head could, for example, begin reading in the middle of a position count field or a synchronization field. Therefore, a synchronization field 35 identifies the beginning and end of the position count fields 34, 36. Thus, any time the controller detects the sequence of 26 bits representing the synchronization field, it determines that the next 22 bits are a position count field. In the preferred embodiment, the synchronization field 35, and all other synchronization fields along the tape, consist of a "0" bit followed by 24 "1" bits followed by a "0" bit. The particular pattern of "1"s and "0"s chosen to comprise the synchronization fields 35 must be made carefully such that the tape controller correctly detects synchronization field 35 on the tape regardless of the longitudinal position encoded in the adjacent position count fields.

Each bit of longitudinal position data (31 or 32) is written in the servo stripe (FIG. 4) by the servo writer. Preferably, each position count field (e.g. 34, 36) represents a number which increments along the length of the tape from beginning to end. The number can be used to find the longitudinal position of the tape at any time during normal tape read speed. This encoding scheme allows the tape controller to identify the tape position accurately, even before any user data is stored on the tape.

Position count fields 34, 36, etc. comprise 22 bits. This allows 2 to the 22nd power or 4,194,304 total counts. In the preferred embodiment, 48 servo frames are needed to obtain one position count (22 frames in position count field 34 or 36 and 26 frames in the adjacent synchronization field 35). If a servo frame is 200 µm long, a tape length of 40.3 kilometers is thus supported (a typical reel uses only a few hundred meters of tape) and the accuracy of determining the longitudinal position is 48 frames times the frame size (200 µm in the preferred embodiment) or 9.6 millimeters. Prior art methods using tachometers and reel radii prediction methods have accuracy levels of more than one meter. Thus, the present invention allows longitudinal positioning which is more than 100 times as accurate as the prior art.

Of course, it should be expressly understood that the number of bits used to constitute a position count field or a synchronization field may be varied without departing from the scope of the invention. Thus, 20, 28, 30 or more (or fewer) frames could be used to constitute a position count field or synchronization field. The use of fewer bits in a count field allows for less total counts and would support a shorter tape length with greater accuracy. Resolution could be increased by counting the number of frames after the position count field is detected. Similarly, the size of the servo frame is a matter of design choice well k<nown to one skilled in the art and forms no portion of the invention.

In an alternate embodiment of the invention the longitudinal position can be encoded into a position count field by means other than simple binary encoding. For example, the longitudinal position may be encoded by binary encoding with an error correction code appended thereto in order to comprise an encoded position count field. This scheme would allow the recovery of the longitudinal position in the presence of errors in detecting the data bits that comprise the position count field. The preferred error correction appends a 6 bit Hamming code (ECC) to the 22 bits of binary encoded data to form the position count field. This allows for single bit error correction and double bit error detection within the position count field. Lengthening of the position count field will require that longer synchronization fields be used. The single bit correcting double bit detecting Hamming code is sufficient for this application but it can be appreciated by one skilled in the art that more powerful codes such as BCH or Reed-Solomon could be used to correct more than a single bit in error. Discussion of these codes as well as theory relating to their development can be found in the text: "Error—Correcting Codes, Peterson and Weldon, MIT Press, 1972. The lengthening of the position count field will require that longer synchronization fields be used.

Given an encoding scheme for the longitudinal position, the representation of the synchronization field 35 may be optimized to allow proper detection of a synchronization field in the presence of errors in detecting the data bits that comprise the surrounding position count fields and the synchronization field itself.

The problem of identifying an optimal representation of synchronization field 35, hereafter referred to as the synchronization character, may be calculated. Given a bit string representing a synchronization character, a position count field optionally including an error correction code, and another synchronization character, the goal is to have agreement between the synchronization character and any sequence of bits from this string only when the synchronization character is aligned with a synchronization character in the bit string. It is also desirable to maximize the difference between the synchronization character and any other sequence of bits from this string. It should be understood that the position count field in the above string of bits could encode any valid position count. To simplify the calculation, one may make a worst case assumption that, when the synchronization character is compared with the bit string, the portion of the synchronization character compared with bits from the position count field are assumed to be in agreement. To further simplify the calculation, one may restrict the search to a particular class of synchronization characters. While the synchronization characters discussed so far have been symmetric, another class with desirable properties is the class of anti-symmetric synchronization characters. While the symmetric synchronization characters can be detected by the same decoder regardless of the direction of the bit stream, the anti-symmetric synchronization characters can be detected with minimal changes to the decoder depending in the direction of the bit stream. The class of anti-symmetric synchronization characters is desirable because members of this class can be selected that eliminate the possibility of mis-aligned bit sets that span the position count field overlapping the chosen synchronization character at all positions not overlapping the position count field. A preferred embodiment utilizes the class of anti-symmetric synchronization characters of length 32 bits to use for a synchronization field which includes the above mentioned position count field of 26 binary encoded data bits and 6 ECC bits. Under these restrictions the selected synchronization character was 0032b3ff (hexadecimal). To mis-identify this synchronization character from the bit-stream requires a minimum of 4 bits in error.

With added intelligence in the tape transport controller, the need for starting the frame counter at a count of one can be removed. For example, the controller can identify the count for a certain tape position (beginning, middle or end of tape). It can then decide what the count should be at all positions of the tape (assuming the tape length is known). If necessary, the controller could also recognize and correct for the counter roll-over if the number of frames exceeds the maximum count available from the 22 bit position count field.

While the invention has been described with respect to a particular embodiment thereof, it is not to be so limited as changes and modifications may be made which are within the full intended scope of the invention as defined by the appended claims. For example, while specific numbers of servo stripes and data tracks have been disclosed, the invention may be utilized with more or less servo stripes or data tracks. While a specific number of bits have been used to define the synchronization and position count fields have been disclosed in the preferred embodiment, more or less bits may be employed without departing from the scope of the invention as defined by the appended claims.

What is claimed is:

1. A method for determining longitudinal position along a length of magnetic tape which includes at least one servo stripe, said servo stripe including a plurality of servo frames to be read by a servo tape head, wherein each servo frame includes a first area having a first frequency and a data field, and a second area having a first portion with a second frequency written thereon, and a second portion with a predetermined pattern of erase frequency written thereon, said method comprising the steps of:

sensing data fields on a predetermined portion separate from the second area having the second frequency and pattern of erase frequency written thereon of a predetermined number of said servo frames;

recognizing said sensed data fields as a position count field; and determining the longitudinal position of said tape with respect to said servo tape head based upon said position count field.

2. A method according to claim 1 wherein said step of recognizing said sensed data fields as said position count field includes the step of grouping a predetermined number of sensed data fields into a synchronization field.

3. A method according to claim 2 wherein said synchronization field includes a uniquely identifiable sequence of data fields.

4. A method according to claim 1 wherein said position count field includes 22 adjacent servo frames.

5. A method according to claim 1 wherein said data fields include a digital signal representing either a high (1) or low (0) signal.

6. A method according to claim 2 wherein said step of recognizing said sensed data fields as said position count field includes sensing said synchronization field before and after said position count field.

7. A method according to claim 6 wherein said synchronization field includes a uniquely identifiable sequence of data fields.

8. A method according to claim 2 wherein said synchronization field includes anti-symmetric synchronization characters.

9. A method according to claim 2 wherein said position count field includes an error correction code.

10. A method of generating a longitudinal position indicator for a plurality of adjacent servo frames written on a length of magnetic tape, wherein each servo frame includes a first area having a first frequency and a data field, and a second area having a first portion with a second frequency written thereon, and a second portion with a predetermined pattern of erase frequency written thereon, comprising the steps of:

sensing data fields on a predetermined portion of a predetermined number of said adjacent servo frames separate from the second area having the second frequency and pattern of erase frequency written thereon;

grouping predetermined ones of said sensed data field signals into a unique position count field;

recognizing a unique pattern of said grouped data fields included in said position count field; and generating a count signal from said unique position count field, said count signal indicative of the longitudinal position of said unique position count field on said length of magnetic tape.

11. A method according to claim 10 wherein said step of grouping said sensed data fields into said position count field includes identifying said position count field by identifying a synchronization field at the beginning and end of said position count field.

12. A method according to claim 11 wherein said synchronization field includes a uniquely identifiable sequence of data fields.

13. A method according to claim 10 wherein said position count field includes data fields from 22 adjacent servo frames.

14. A method according to claim 10 wherein said sensed data fields include a digital signal representing either a high (1) or low (0) signal.

15. A method according to claim 10 wherein said step of grouping said sensed data fields into said position count field includes the step of grouping said sensed data fields into a synchronization field before and after said position count field.

16. A method according to claim 15 wherein said synchronization field includes a uniquely identifiable sequence of data fields.

17. A method according to claim 11 wherein said synchronization field includes anti-symmetric synchronization characters.

18. A method according to claim 11 wherein said position count field includes an error correction code.

19. A method according to claim 9 wherein said error correction code includes a 6 bit Hamming code.

20. A method according to claim 18 wherein said error correction code includes a 6 bit Hamming code.

* * * * *